United States Patent
White et al.

(10) Patent No.: US 11,272,697 B1
(45) Date of Patent: Mar. 15, 2022

(54) FISHING ROD HOLDER WITH STRIKE INDICATOR

(71) Applicants: Frank White, Chicago, IL (US); George White, Chicago, IL (US)

(72) Inventors: Frank White, Chicago, IL (US); George White, Chicago, IL (US)

( * ) Notice: Subject to any disclaimer, the term of this patent is extended or adjusted under 35 U.S.C. 154(b) by 522 days.

(21) Appl. No.: 16/292,499

(22) Filed: Mar. 5, 2019

(51) Int. Cl.
*A01K 97/12* (2006.01)
*A01K 97/10* (2006.01)
*F16M 11/18* (2006.01)
*F16M 11/10* (2006.01)
*F16M 11/24* (2006.01)

(52) U.S. Cl.
CPC ............ *A01K 97/125* (2013.01); *A01K 97/10* (2013.01); *F16M 11/10* (2013.01); *F16M 11/18* (2013.01); *F16M 11/242* (2013.01)

(58) Field of Classification Search
CPC ...... A01K 97/125; A01K 97/10; A01K 97/00; A01K 97/12; A01K 97/08; Y10S 224/922
USPC ............................................................ 43/17
See application file for complete search history.

(56) References Cited

U.S. PATENT DOCUMENTS

| | | | | |
|---|---|---|---|---|
| 421,468 A * | 2/1890 | Adams | ................... | F16M 11/10 248/649 |
| 1,330,314 A * | 2/1920 | Gott | ....................... | A01K 97/12 43/17 |
| 1,479,765 A * | 1/1924 | Whiting | ............... | F16M 11/242 248/168 |
| 2,380,911 A * | 7/1945 | Petersen | .............. | F16M 11/245 248/169 |
| 2,586,721 A * | 2/1952 | Rubin | ................ | F16M 11/2014 248/183.1 |
| 2,596,403 A * | 5/1952 | Hoffman | ................ | A01K 97/10 43/21.2 |
| 2,613,902 A * | 10/1952 | Loken | .................... | F16M 11/32 248/188.91 |
| 2,645,050 A * | 7/1953 | Golias | .................. | A01K 97/125 43/17 |
| 2,732,543 A * | 1/1956 | Mogren | ............... | A01K 97/125 43/17 |
| 2,752,115 A * | 6/1956 | Green | .................... | A01K 97/10 248/533 |
| 2,816,388 A * | 12/1957 | Hartley | .................. | A01K 97/10 43/17 |
| 3,027,675 A * | 4/1962 | Parsons | ................ | A01K 97/125 43/17 |

(Continued)

*Primary Examiner* — Nkeisha Smith
(74) *Attorney, Agent, or Firm* — Kyle A. Fletcher, Esq.

(57) ABSTRACT

The fishing rod holder with strike indicator is a free-standing fishing strike indicating device. The fishing rod holder with strike indicator is a stand which holds the fishing rod. The fishing rod holder with strike indicator allows for the adjustment of the cant between the fishing rod and the ground. The adjustment of the cant allows for the adjustment of the angle of attack between the fishing line and the water. The fishing rod holder with strike indicator comprises a tripod, a pedestal, and a control circuit. The pedestal mounts on the tripod. The control circuit is contained within the tripod. The tripod is a supporting structure that adjusts the elevation of the pedestal relative to the ground. The fishing rod mounts on the pedestal. The control circuit detects when a fish has struck the fishing line and generates a visible alarm and an audible alarm.

15 Claims, 6 Drawing Sheets

(56) References Cited

U.S. PATENT DOCUMENTS

| | | | | |
|---|---|---|---|---|
| 3,041,769 A * | 7/1962 | Bray | A01K 97/10 | 43/17 |
| 3,327,978 A * | 6/1967 | Gates | A01K 97/10 | 248/520 |
| 3,546,805 A * | 12/1970 | Schaefer | A01K 97/10 | 43/17 |
| 3,559,327 A * | 2/1971 | Christopher | A01K 97/125 | 43/17 |
| 3,670,443 A * | 6/1972 | Federline | A01K 97/125 | 43/17 |
| 3,835,568 A * | 9/1974 | Whitfield | A01K 97/10 | 43/17 |
| 3,992,798 A * | 11/1976 | Schmitt, Sr. | A01K 97/10 | 43/17 |
| 4,043,070 A * | 8/1977 | Lamothe | A01K 87/00 | 43/21.2 |
| 4,177,595 A * | 12/1979 | Chon | A01K 97/10 | 248/183.2 |
| 4,236,339 A * | 12/1980 | White | A01K 97/10 | 43/17 |
| 4,245,419 A * | 1/1981 | McManus | A01K 97/10 | 248/538 |
| 4,290,574 A * | 9/1981 | Archibald | F16M 11/242 | 248/177.1 |
| 4,317,552 A * | 3/1982 | Weidler | F16M 11/16 | 211/203 |
| D281,805 S | 12/1985 | Bolinger | | |
| 4,616,437 A | 10/1986 | Harvey | | |
| 4,767,090 A * | 8/1988 | Hartman | F16M 11/16 | 24/273 |
| 4,807,384 A | 2/1989 | Roberts, Sr. | | |
| 5,269,088 A * | 12/1993 | Slaback, Jr | A01K 97/12 | 43/17 |
| 5,355,610 A * | 10/1994 | Sizemore | A01K 97/10 | 43/17 |
| 5,488,796 A * | 2/1996 | Taylor | A01K 97/01 | 43/17 |
| 5,903,998 A * | 5/1999 | Hawkins | A01K 97/11 | 43/15 |
| 6,035,968 A * | 3/2000 | Morales | A01M 31/02 | 182/116 |
| 6,341,443 B1 * | 1/2002 | Watford | A01K 97/10 | 43/17 |
| 6,374,532 B1 * | 4/2002 | Klein | A01K 97/01 | 43/17 |
| 6,389,734 B1 * | 5/2002 | Niles | A01K 97/01 | 43/17 |
| 6,438,889 B1 * | 8/2002 | Handy | A01K 97/10 | 248/166 |
| 6,898,892 B2 * | 5/2005 | Senckowski | A01K 97/01 | 43/16 |
| 7,043,869 B1 * | 5/2006 | Hubbard | A01K 97/10 | 43/21.2 |
| 7,331,139 B2 * | 2/2008 | Moses | A01K 97/10 | 211/70.8 |
| 8,336,248 B2 * | 12/2012 | Miškatovi | A01K 97/125 | 43/17 |
| 8,453,372 B1 * | 6/2013 | Moe | A01K 97/10 | 43/21.2 |
| 8,943,739 B2 * | 2/2015 | Blake, III | A01K 97/08 | 43/54.1 |
| 9,179,659 B1 * | 11/2015 | Berthiaume | A01K 97/125 | |
| 9,320,268 B1 * | 4/2016 | Harris | A01K 97/10 | |
| 9,609,856 B1 * | 4/2017 | Little | G08B 21/18 | |
| 10,718,997 B2 * | 7/2020 | Kiernan-Lewis | F16M 11/10 | |
| 2011/0315834 A1 * | 12/2011 | Lukic | F16M 11/36 | 248/125.8 |
| 2013/0232844 A1 * | 9/2013 | Gallo | F41A 23/12 | 42/94 |
| 2015/0204479 A1 * | 7/2015 | Bryant | F16M 11/12 | 348/376 |
| 2015/0230447 A1 | 8/2015 | Keossian | | |
| 2015/0335002 A1 * | 11/2015 | Andrews | A01K 97/10 | 43/54.1 |
| 2016/0037761 A1 * | 2/2016 | Hollingshead | A01K 97/10 | 248/431 |
| 2016/0100564 A1 | 4/2016 | Perez et al. | | |

\* cited by examiner

FISHING ROD HOLDER WITH STRIKE INDICATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and fishing including accessories for angling, more specifically, a signal device using electronic components. (A01K97/125)

SUMMARY OF INVENTION

The fishing rod holder with strike indicator is a freestanding fishing strike indicating device. The fishing rod holder with strike indicator is configured for use with a fishing rod. The fishing rod is further defined with a fishing line. The fishing rod holder with strike indicator is a stand. The fishing rod mounts in the fishing rod holder with strike indicator. The fishing rod holder with strike indicator holds the fishing rod during angling. The fishing rod holder with strike indicator allows for the adjustment of the cant between the fishing rod and the ground. The adjustment of the cant allows for the adjustment of the angle of attack between the fishing line and the water. The fishing rod holder with strike indicator comprises a tripod, a pedestal, and a control circuit. The pedestal mounts on the tripod. The control circuit is contained within the pedestal. The tripod is a supporting structure that raises the elevation of the pedestal relative to the ground. The tripod is connected to the pedestal such that the tripod allows for the adjustment of the angle of the fishing rod holder with strike indicator relative to the pitch of the ground. The fishing rod mounts on the pedestal. The control circuit detects when a fish has struck the fishing line and generates a visible alarm and an audible alarm.

These together with additional objects, features and advantages of the fishing rod holder with strike indicator will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing rod holder with strike indicator in detail, it is to be understood that the fishing rod holder with strike indicator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing rod holder with strike indicator.

It is therefore important that the claims be regarded as including such equivalent construction insofar as they do not depart from the spirit and scope of the fishing rod holder with strike indicator. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
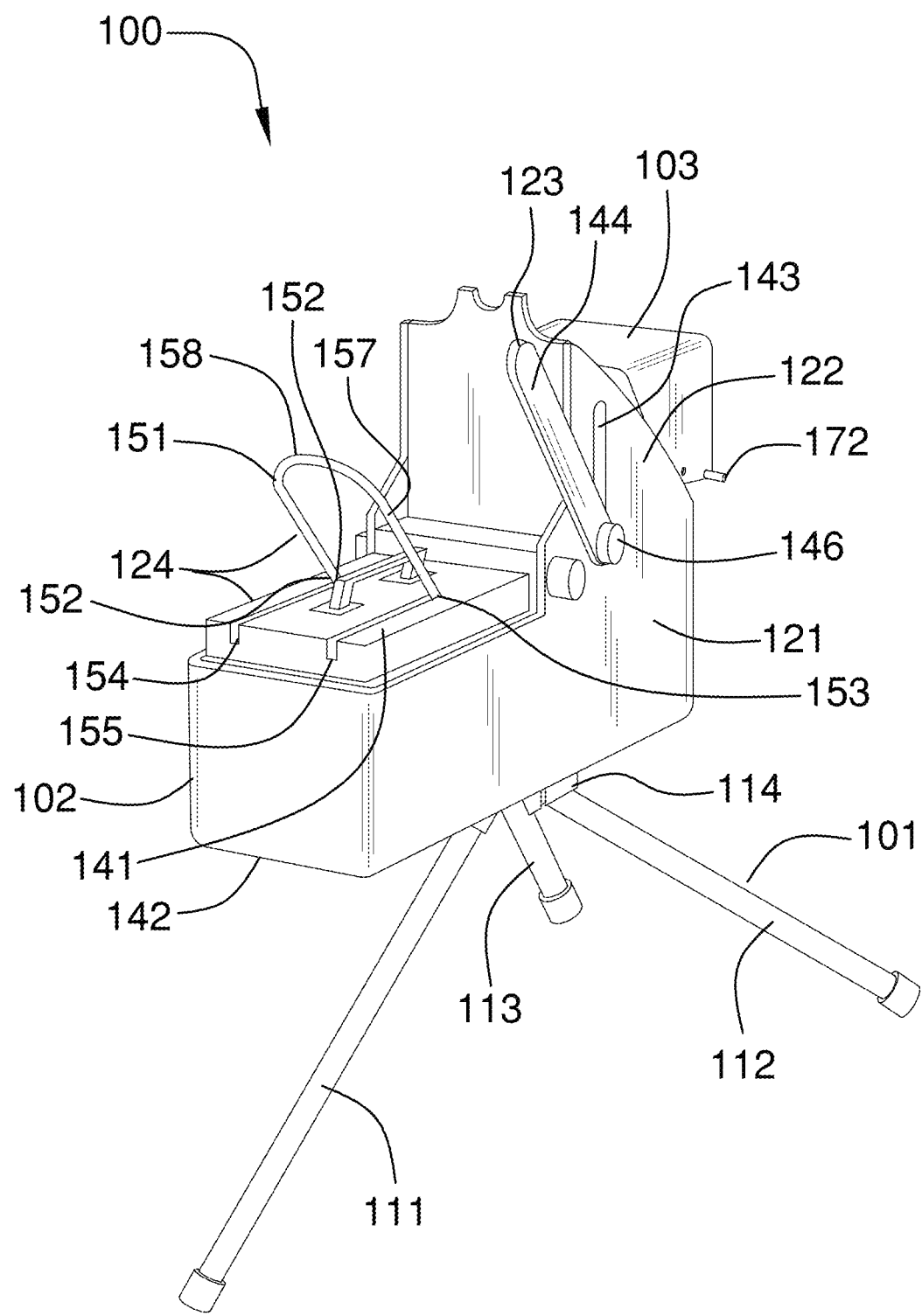
FIG. 1 is a perspective view of an embodiment of the disclosure.
Figure 2:
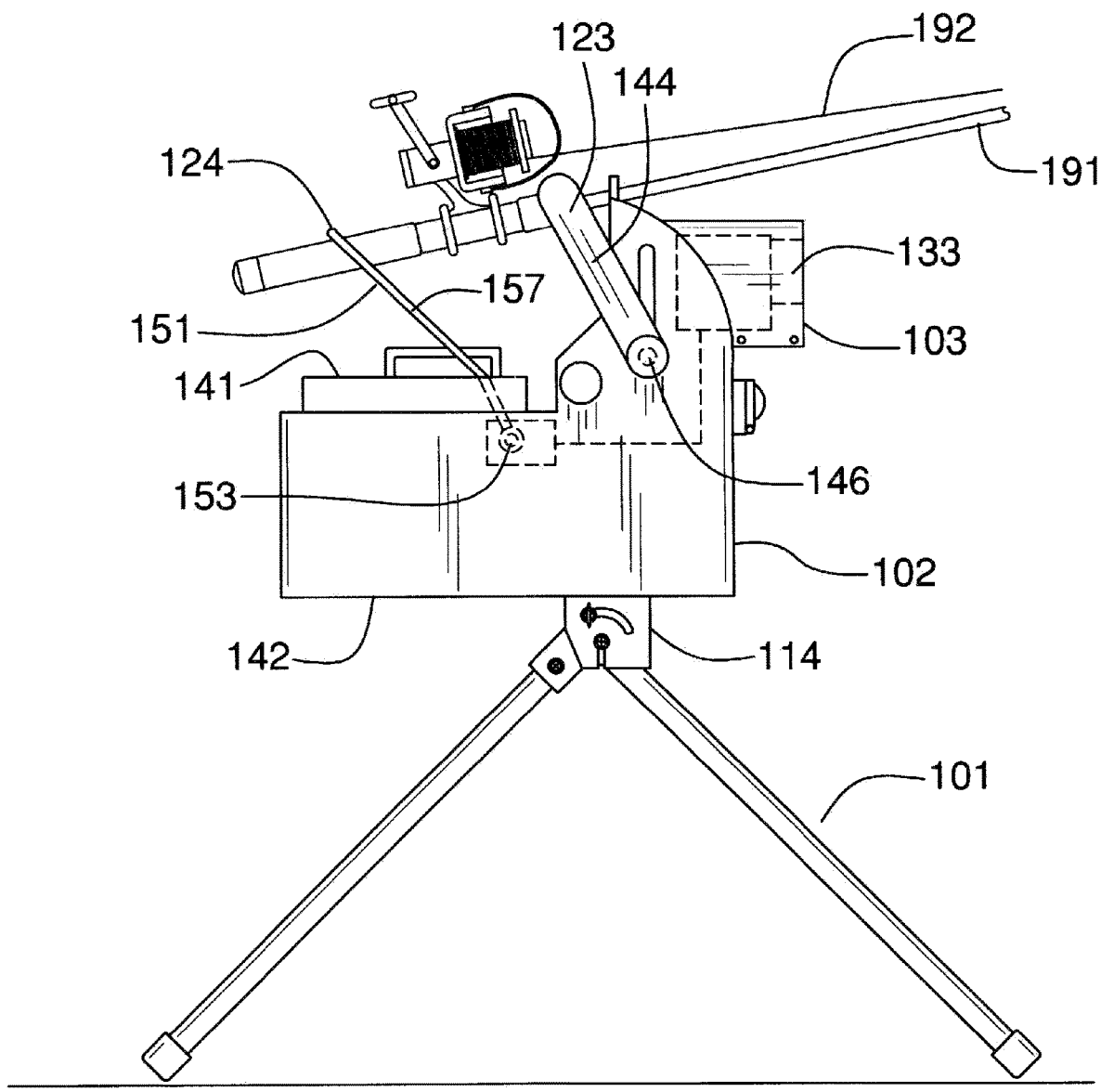
FIG. 2 is a side view of an embodiment of the disclosure.
Figure 3:
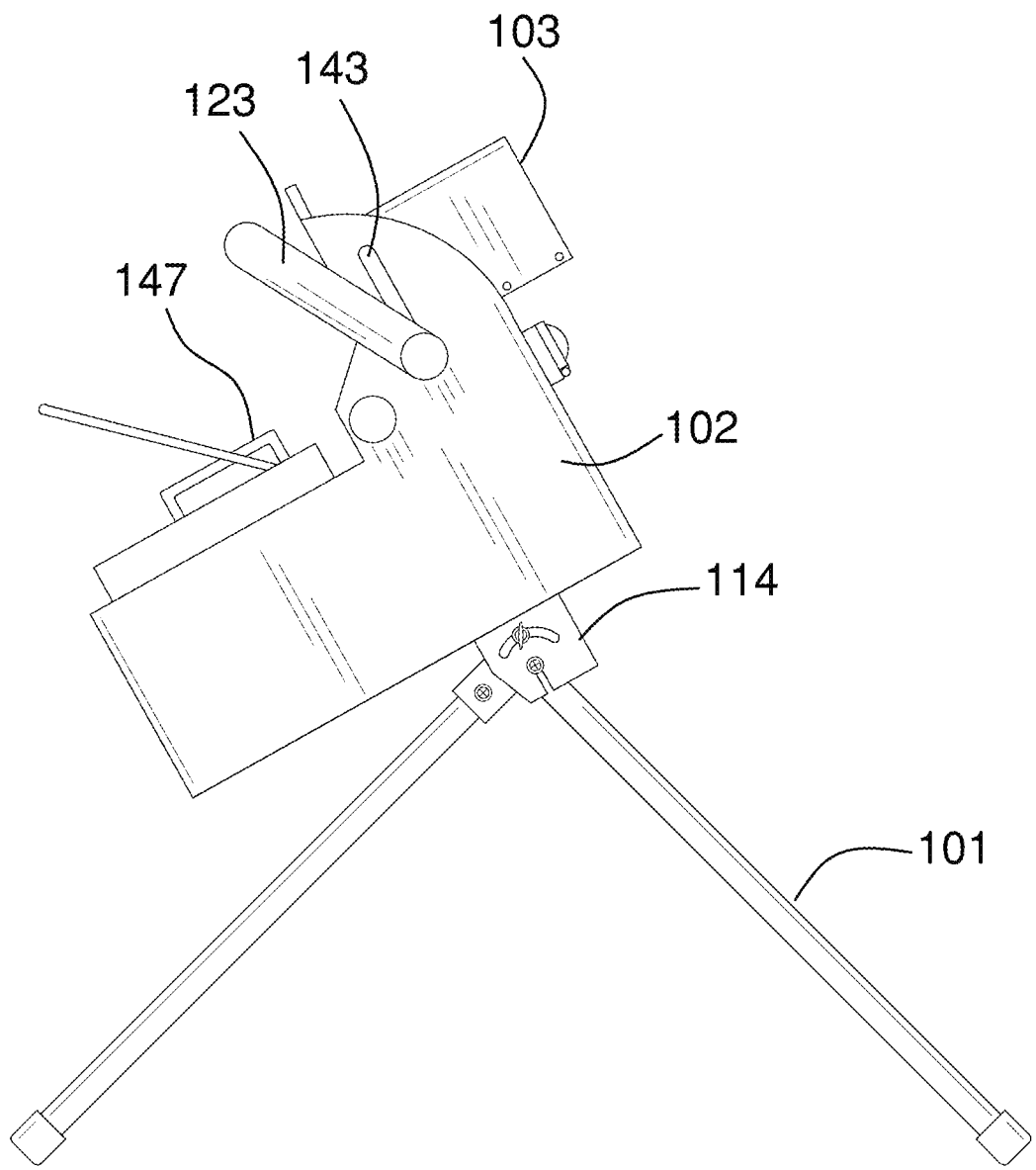
FIG. 3 is a side view of an embodiment of the disclosure.
Figure 4:
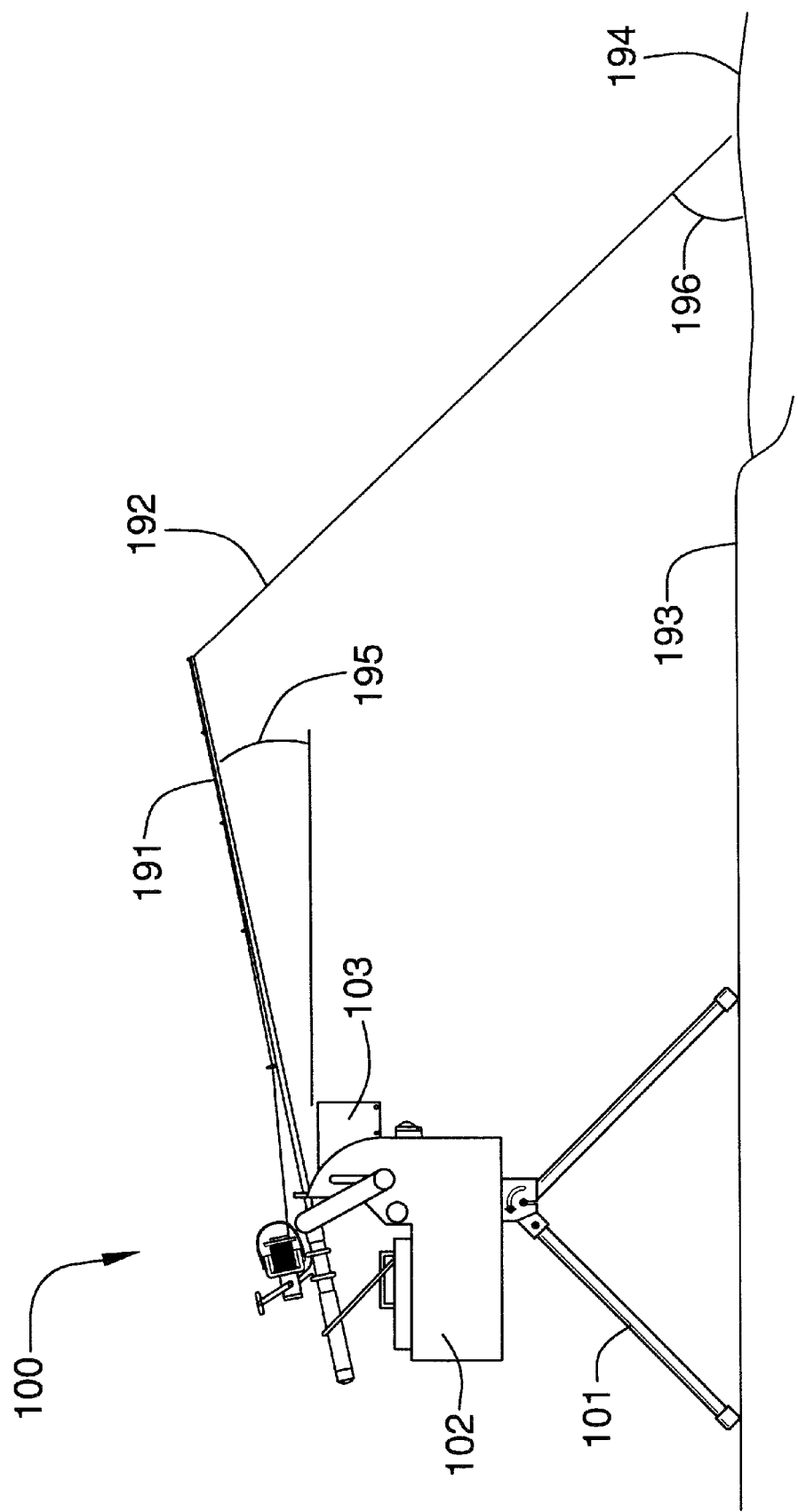
FIG. 4 is an in-use view of an embodiment of the disclosure.
Figure 5:
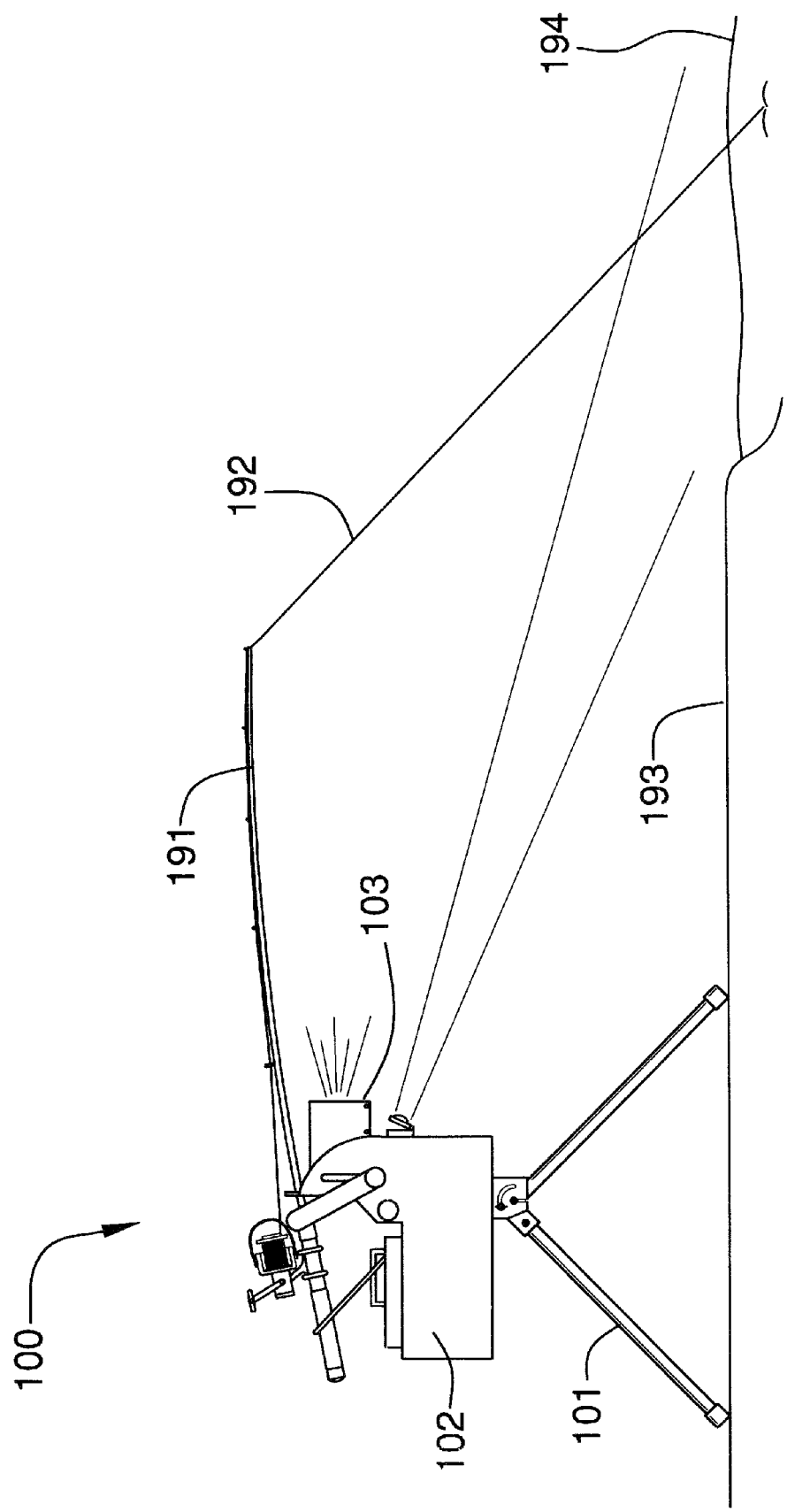
FIG. 5 is an in-use view of an embodiment of the disclosure.
Figure 6:
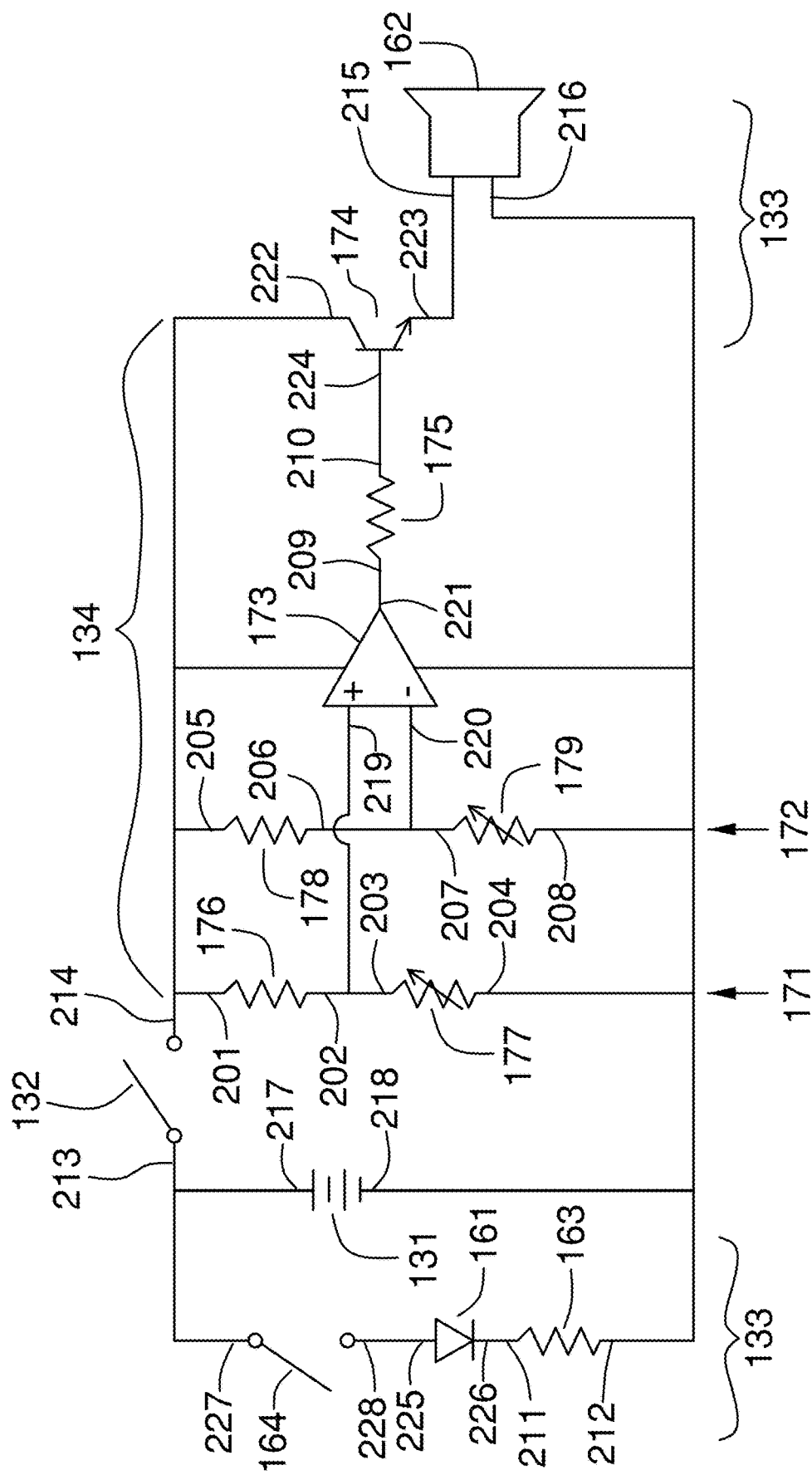
FIG. 6 is a schematic view of an embodiment of the disclosure.

Detailed reference will now be made to one or more potential embodiments of the disclosure, which are illustrated in FIGS. 1 through 6.

The fishing rod holder with strike indicator 100 (hereinafter invention) is a free-standing fishing strike indicating device. The invention 100 is configured for use with a fishing rod 191. The fishing rod 191 is further defined with a fishing line 192. The fishing rod 191 is further defined with a cant 195. The fishing line 192 is further defined with an angle of attack 196. The fishing rod 191 is defined in greater detail elsewhere in this disclosure. The fishing line 192 is defined in greater detail elsewhere in this disclosure. The ground 193 is defined in greater detail elsewhere in this disclosure. The cant 195 is a measure of the angle between the fishing rod 191 and a horizontal plane that is perpendicular to the force of gravity. The angle of attack 196 is a measure of the angle between the fishing line 192 and the plane formed by the water 194.

The invention 100 is a stand. The fishing rod 191 mounts in the invention 100. The invention 100 holds the fishing rod 191 during angling. The invention 100 allows for the adjustment of the cant 195 between the fishing rod 191 and the ground 193. The adjustment of the cant 195 allows for the adjustment of the angle of attack 196 between the fishing line 192 and the water 194. The invention 100 comprises a tripod 101, a pedestal 102, and a control circuit 103. The pedestal 102 mounts on the tripod 101. The control circuit 103 is contained within the pedestal 102. The tripod 101 is a supporting structure that raises the elevation of the pedestal 102 relative to the ground 193. The fishing rod 191 mounts on the pedestal 102. The control circuit 103 detects when a fish has struck the fishing line 192 and generates a visible alarm and an audible alarm.

The tripod 101 is a supporting structure. The tripod 101 forms the load path between the pedestal 102 and the ground 193 supporting the invention 100. The tripod 101 raises the pedestal 102 above the ground 193. The tripod 101 is a supporting structure such that the elevation of the pedestal 102 above the ground 193 is raised. The tripod 101 rotates relative to the pedestal 102 such that the cant 195 of the pedestal 102 is adjustable. The tripod 101 comprises a first leg 111, a second leg 112, a third leg 113, and a pedestal mount 114.

The first leg 111 is a shaft structure. The first leg 111 forms a load path that transfers a portion of the load path from the pedestal 102 to the ground 193. The first leg 111 raises the pedestal 102 above the ground 193. The first leg 111 is a supporting structure such that the elevation of the pedestal 102 above the ground 193 is raised by the span of the length of the first leg 111.

The second leg 112 is a shaft structure. The second leg 112 forms a load path that transfers a portion of the load path from the pedestal 102 to the ground 193. The second leg 112 raises the pedestal 102 above the ground 193. The second leg 112 is a supporting structure such that the elevation of the pedestal 102 above the ground 193 is raised by the span of the length of the second leg 112.

The third leg 113 is a shaft structure. The third leg 113 forms a load path that transfers a portion of the load path from the pedestal 102 to the ground 193. The third leg 113 raises the pedestal 102 above the ground 193. The third leg 113 is a supporting structure such that the elevation of the pedestal 102 above the ground 193 is raised by the span of the length of the third leg 113.

The pedestal mount 114 is a mounting structure that forms the superior structure of the tripod 101. The pedestal mount 114 attaches the pedestal 102 to the first leg 111, the second leg 112, and the third leg 113. The pedestal mount 114 is a hinged structure such that the first leg 111, the second leg 112, and the third leg 113 can rotate relative to the pedestal mount 114 between a storage position and a deployed position.

The pedestal 102 is an intermediate structure that forms a load path between the load of the fishing rod 191 and the tripod 101. The pedestal 102 contains the control circuit 103. The pedestal 102 comprises a base block 121, an elevation plate 122, an inferior rod support 123, and a superior rod support 124.

The base block 121 is a rectilinear block structure. The base block 121 forms a mounting structure on which the elevation plate 122, the inferior rod support 123, and the superior rod support 124 attach. The base block 121 forms the load path between the elevation plate 122, the inferior rod support 123, and the superior rod support 124 and the pedestal mount 114. The base block 121 comprises a superior face 141, an inferior face 142, and a handle 147.

The superior face 141 is the face of the base block 121 that is distal from the ground 193. The superior face 141 forms the superior horizontal surface of the base block 121. The inferior face 142 is the face of the base block 121 that is distal from the superior face 141. The inferior face 142 forms the inferior horizontal surface of the base block 121. The pedestal mount 114 attaches to the inferior face 142. The handle 147 is a grip that attaches to the superior face 141 of the base block 121.

The elevation plate 122 is a disk-shaped structure. The elevation plate 122 attaches to the base block 121 such that the faces of the elevation plate 122 are perpendicular to the superior face 141 of the base block 121. The elevation plate 122 further comprises an elevation slot 143. The elevation slot 143 is a slot formed through the faces of the disk-shape of the elevation plate 122. The inferior rod support 123 attaches to the elevation slot 143 such that the elevation of the inferior rod support 123 is changed by changing the position of the inferior rod support 123 relative to the elevation slot 143.

The inferior rod support 123 is a supporting structure on which the fishing rod 191 rests. The inferior rod support 123 attaches to the elevation plate 122 such that the elevation of the inferior rod support 123 above the ground 193 is adjustable. The inferior rod support 123 attaches to the elevation plate 122 such that the angle formed by the inferior rod support 123 relative to the ground 193 is adjustable. The fishing rod 191 rests on the inferior rod support 123 such that the inferior rod support 123 forms a pivot around which the fishing rod 191 rotates. The superior rod support 124 is a restraining structure which prevents the fishing rod 191 from rotating off the inferior rod support 123. The inferior rod support 123 comprises a stanchion 144, and a tensioning detent 146.

The stanchion 144 is a rectangular disk-shaped structure. The tensioning detent 146 attaches the stanchion 144 to the elevation slot 143 of the elevation plate 122 such that the stanchion 144 rotates relative to the elevation plate 122. The stanchion 144 supports any reel attached to the fishing rod 191.

The tensioning detent 146 is a set screw structure that attaches the stanchion 144 of the inferior rod support 123 in a fixed position relative to the elevation slot 143 of the elevation plate 122. The tensioning detent 146 forms the pivot around which the angle between the inferior rod support 123 and the ground 193 adjusts.

The superior rod support 124 attaches to the superior face of the base block 121. The superior rod support 124 and the superior face 141 of the base block 121 combine to form a loop structure into which the fishing rod 191 inserts. The superior rod support 124 rotates relative to the superior face 141 of the base block 121. The superior rod support 124 forms a structure that is superior to the fishing rod 191 such that the rotation of the superior rod support 124 forms a stop-motion that limits the range of rotation of the fishing rod 191 around the inferior rod support 123. The position of the superior rod support 124 is such that the superior rod support 124 on the superior face is adjustable. The superior rod support 124 comprises a hyoid structure 151, a first spring hinge 152, a second spring hinge 153, a first groove 154, and a second groove 155.

The hyoid structure 151 is a hyoid-shaped structure that attaches to the superior face 141 of the base block 121. The fishing rod 191 inserts underneath the hyoid structure 151 such that the hyoid structure 151 limits the rotation of the fishing rod 191 around the inferior rod support 123. The hyoid structure 151 comprises a first hyoid arm 156, a second hyoid arm 157, and a hyoid crossbeam 158. The hyoid-shape of the hyoid structure 151, including the first hyoid arm 156, the second hyoid arm 157, and the hyoid crossbeam 158 are defined in greater detail elsewhere in this disclosure.

The first spring hinge 152 attaches the free end of the first hyoid arm 156 to the first groove 154 such that the first hyoid arm 156 moves freely within the first groove 154. The first spring hinge 152 is a spring-loaded hinge. The relaxed shape of the first spring hinge 152 holds the hyoid structure 151 in a position that is parallel to the superior face 141 of the base block 121. The first spring hinge 152 presses the hyoid crossbeam 158 down upon the fishing rod 191 such that the hyoid structure 151 maintains its position on the fishing rod 191.

The second spring hinge 153 attaches the free end of the second hyoid arm 157 to the second groove 155 such that the second hyoid arm 157 moves freely within the second groove 155. The second spring hinge 153 is a spring-loaded hinge. The relaxed shape of the second spring hinge 153 holds the hyoid structure 151 in a position that is parallel to the superior face 141 of the base block 121. The second spring hinge 153 presses the hyoid crossbeam 158 down upon the fishing rod 191 such that the hyoid structure 151 maintains its position on the fishing rod 191.

The second spring hinge 153 is identical to the first spring hinge 152. The second spring hinge 153 attaches to the position divider 171 such that the rotation of the second spring hinge 153 changes the voltage signal presented by the position divider 171 to the differential amplifier 173. The position divider 171 and the differential amplifier 173 are components of the comparator circuit 134. The position divider 171 and the differential amplifier 173 are described in greater detail elsewhere in this disclosure The first groove 154 is a channel that is formed in the superior face 141 of the base block 121. The first groove 154 guides the movement of the first hyoid arm 156 and the first spring hinge 152 in the horizontal direction along the superior face 141. The second groove 155 is a channel that is formed in the superior face 141 of the base block 121. The second groove 155 guides the movement of the second hyoid arm 157 and the second spring hinge 153 in the horizontal direction along the superior face 141. The first groove 154 and the second groove 155 combine to guide the overall movement of the superior rod support 124 on the superior face 141 of the base block 121.

The control circuit 103 is an electrical circuit. The control circuit 103 detects when a fish strikes the fishing line 192 of the fishing rod 191. The control circuit 103 generates a visual alarm and an audible alarm when the control circuit 103 detects a fish strike. The control circuit 103 detects the fish strike by detecting a change in the cant 195 of the fishing rod 191. The control circuit 103 comprises a battery 131, a master switch 132, a plurality of alarms and lamps 133, and a comparator circuit 134. The master switch 132 is further defined with a thirteenth lead 213 and a fourteenth lead 214. The battery 131 is further defined with a positive terminal 217 and a negative terminal 218.

The battery 131 is a chemical device. The battery 131 converts chemical potential energy into electrical energy. The electrical energy generated by the battery 131 powers the operation of the control circuit 103.

The master switch 132 is a commercially available maintained switch. The master switch 132 controls the flow of electricity from the battery 131 into the plurality of alarms and lamps 133 and the comparator circuit 134. The master switch 132 acts as the power switch for the invention 100.

The plurality of alarms and lamps 133 forms a set of visual and audible alarms that indicate a fish strike. The plurality of alarms and lamps 133 comprises one or more LEDs 161 and a speaker 162. The speaker 162 is further defined with a fifteenth lead 215 and a sixteenth lead 216. Each of the one or more LEDs 161 is further defined with an anode 225 and a cathode 226.

Each of the one or more LEDs 161 is identical. Each of the one or more LEDs 161 is a two-terminal semiconducting electrical device used to generate illumination. The one or more LEDs 161 physically generate an illumination that forms the visual alarm portion of the plurality of alarms and lamps 133. The use of one or more LEDs 161 in an electrical circuit is well-known and documented in the electrical arts. The one or more LEDs 161 further comprises a pull-down resistor 163 and a lamp switch 164. The pull-down resistor 163 is further defined with an eleventh lead 211 and a twelfth lead 212. The lamp switch 164 is further defined with a seventeenth lead 227 and an eighteenth lead 228. The pull-down resistor 163 is a resistor that is placed in series with the one or more LEDs 161. The pull-down resistor 163 limits the amount of electricity that flows through the one or more LEDs 161. The lamp switch 164 controls the flow of electricity from the battery 131 into the one or more LEDs 161.

The speaker 162 is a two-terminal transducer used to convert an electrical signal into an audible sound. The speaker physically generates an audible sound that forms the audible alarm portion of the plurality of alarms and lamps 133. The use of a speaker 162 in an electrical circuit is well-known and documented in the electrical arts. In the first potential embodiment of the disclosure, the speaker 162 is a buzzer.

The comparator circuit 134 controls the operation of the plurality of alarms and lamps 133. The comparator circuit 134 is an electrical circuit. The comparator circuit 134 measures a voltage generated by the position of the superior rod support relative to the superior face 141 of the base block 121. The comparator circuit 134 compares the measured voltage generated by the position of the superior rod support 124 to a threshold voltage. When the voltage measured by the comparator circuit 134 is greater than the threshold voltage, the comparator circuit 134 generates a signal that initiates the activation of the plurality of alarms and lamps 133.

The comparator circuit 134 comprises a position divider 171, a threshold divider 172, a differential amplifier 173, a transistor 174, and a limit resistor 175. The limit resistor is further defined with a ninth lead 209 and a tenth lead 210. The differential amplifier 173 is further defined with a first amplifier input 219, a second amplifier input 220, and an amplifier output 221. The transistor 174 is further defined with a collector 222, an emitter 223, and a base 224.

The position divider 171 is a voltage divider. The position divider 171 measures the position of the hyoid structure 151 of the superior rod support 124. The position divider 171 presents a voltage to the differential amplifier 173 that varies as a function of the position of the second spring hinge 153. The position divider 171 further comprises a first pull-up resistor 176 and a first potentiometer 177. The first pull-up resistor 176 is further defined with a first lead 201 and a second lead 202. The first potentiometer 177 is further defined with a third lead 203 and a fourth lead 204.

The first pull-up resistor 176 is a fixed value electrical resistor. The first pull-up resistor 176 electrically connects in series with the first potentiometer 177. The first potentiometer 177 is a commercially available potentiometer that connects to the second spring hinge 153 such that the rotation of the second spring hinge 153 varies the resistance presented by the first potentiometer 177. The differential amplifier 173 measures the voltage generated by the position of the second spring hinge 153 between the first pull-up resistor 176 and the first potentiometer 177.

The threshold divider 172 is a voltage divider. The threshold divider 172 presents the threshold voltage to the differential amplifier 173. The threshold divider 172 is manually adjustable. The threshold divider 172 further comprises a second pull-up resistor 178 and a second potentiometer 179. The second pull-up resistor 178 is further defined with a fifth lead 205 and a sixth lead 206. The second potentiometer 179 is further defined with a seventh lead 207 and an eighth lead 208.

The second pull-up resistor 178 is a fixed value electrical resistor. The second pull-up resistor 178 electrically connects in series with the second potentiometer 179. The second potentiometer 179 is a commercially available potentiometer that is manually adjusted. The second potentiometer 179 sets the threshold voltage against which the measured voltage from the position divider 171 is compared. The adjustment mechanism of the second potentiometer 179 is accessible from the exterior of the base block 121.

The differential amplifier 173 is a commercially available electrical device that: 1) amplifies a control signal presented by the voltage difference between the voltage presented by the position divider 171 and the voltage presented by the threshold divider 172. The differential amplifier 173 drives the transistor 174; and, 2) electrically buffers the position divider 171 and the threshold divider 172 from voltage spikes generated by the transistor 174. The differential amplifier 173 is defined in greater detail elsewhere in this disclosure.

The transistor 174 is a three-terminal semiconductor device. The transistor 174 operates as a switch. When a voltage is applied to the base 224, current will flow into the base 224, and the transistor 174 will act like a closed switch allowing current to flow from the collector 222 to the emitter 223. When the voltage is removed from the base 224, the transistor 174 will act like an open switch disrupting current flow from the collector 222 to the emitter 223. The transistor 174 is defined in greater detail elsewhere in this disclosure.

The limit resistor 175 is an electrical resistor that limits the flow of electricity from the amplifier output 221 of the differential amplifier 173 into the base 224 of the transistor 174.

The following two paragraphs describe the theory of operation of the invention 100.

The angle of attack 196 of the fishing line 192 entering the water 194 is determined by the cant 195 of the fishing rod 191. The cant 195 of the fishing rod 191 is a function of the elevation of the fishing rod 191 as set by the inferior rod support 123. The cant 195 of the fishing rod 191 is a function of the angle of the inferior rod support 123 relative to the ground 193 as set by the inferior rod support 123. The cant 195 of the fishing rod 191 is a function of the position of the superior rod support 124 on the superior face 141 of the base block 121. The cant 195 is adjusted by simultaneously adjusting the elevation of the fishing rod 191, the angle of the inferior rod support 123 relative to the ground 193 and the position of the superior rod support 124 on the superior face 141.

The control circuit 103 monitors the position of the fishing rod 191 by monitoring the position of the superior rod support 124 relative to the superior face 141. When a fish strike occurs, the angle of attack 196 of the fishing line 192 changes which in turn changes the cant 195 of the fishing rod 191. The change in the cant 195 of the fishing rod 191 causes the fishing rod 191 to rotate around the inferior rod support 123 which changes the position of the superior rod support 124 relative to the superior face 141 of the base block 121. In the first potential embodiment of the disclosure, the range of motion of the cant 195 is from 45 degrees above the horizontal plane to 45 degrees below the horizontal plane. The control circuit 103 measures the position of the superior rod support 124 relative to the superior face 141 of the superior rod support 124. When the position of the superior rod support 124 passes a previously determined threshold, the control circuit activates a plurality of alarms and lamps 133. The previously determined threshold is adjustable.

The following four paragraphs describe the assembly of the control circuit 103.

The positive terminal 217 of the battery 131 electrically connects to the thirteenth lead 213 of the master switch 132. The positive terminal 217 of the battery 131 electrically connects to the seventeenth lead 217 of the lamp switch 164. The fourteenth lead 214 of the master switch 132 electrically connects to the first lead 201 of the first pull-up resistor 176. The fourteenth lead 214 of the master switch 132 electrically connects to the fifth lead 205 of the second pull-up resistor 178. The fourteenth lead 214 of the master switch 132 electrically connects to the collector 222 of the transistor 174.

The second lead 202 of the first pull-up resistor 176 electrically connects to the third lead 203 of the first potentiometer 177. The second lead 202 of the first pull-up resistor 176 electrically connects to the first amplifier input of the differential amplifier 173. The sixth lead 206 of the second pull-up resistor 178 electrically connects to the seventh lead 207 of the second potentiometer 179. The sixth lead 206 of the second pull-up resistor 178 electrically connects to the second amplifier input 220 of the differential amplifier 173. The amplifier output 221 of the differential amplifier 173 electrically connects to the ninth lead 209 of the limit resistor 175.

The tenth lead 210 of the limit resistor 175 electrically connects to the base 224 of the transistor 174. The emitter 223 of the transistor 174 electrically connects to the fifteenth lead 215 of the speaker 162.

The eighteenth lead 218 of the lamp switch 164 electrically connects to the anode 225 of each of the one or more LEDs 161. The cathode 226 of each of the one or more LEDs 161 electrically connects to the eleventh lead 211 of the pull-down resistor 163.

The sixteenth lead 216 of the speaker 162 electrically connects to the negative terminal 218 of the battery 131. The twelfth lead 212 of the pull-down resistor 163 electrically connects to the negative terminal 218 of the battery 131. The eighth lead 208 of the second potentiometer 179 electrically connects to the negative terminal 218 of the battery 131. The fourth lead 204 of the first potentiometer 177 electrically connects to the negative terminal 218 of the battery 131.

The following definitions were used in this disclosure:

Amplifier: As used in this disclosure, an amplifier refers to an electronic component that increases voltage, current, or power of an input signal. Specifically, within this disclosure, an amplifier refers to a differential amplifier. A differential amplifier is a device with two inputs with a single output. A difference amplifier amplifies the voltage difference between the two inputs.

Angle of Attack: As used in this disclosure, the angle of attack refers to the angle formed between the direction of a line relative to a reference line or plane.

Battery: As used in this disclosure, a battery is a chemical device consisting of one or more cells, in which chemical energy is converted into electricity and used as a source of power. Batteries are commonly defined with a positive terminal and a negative terminal.

Buzzer: As used in this disclosure, a buzzer is two lead electrical device that generates an audible sound when a voltage is applied across the two leads.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. Specifically, the surface area of an end of the prism-shaped object that forms the disk is greater than the lateral face of the prism-shaped object that forms the disk. In this disclosure, the ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend the span of the distance between any two objects.

Fishing Line: As used in this disclosure, a fishing line is a monofilament cord to which a hook is attached to capture a fish.

Fishing Rod: As used in this disclosure, a fishing rod is a tapered shaft to which a fishing line is attached.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Groove: As used in this disclosure, a groove is an open channel or trough used to guide the motion of an object.

Ground: As used in this disclosure, the ground is a solid supporting surface formed by the Earth. The term level ground means that the supporting surface formed by the ground is roughly perpendicular to the force of gravity.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids generally have a U shaped appearance.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lead: As used in this disclosure, a lead is a conductor that is physically used to electrically connect an electrical component into a larger circuit assembly.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: A used in this disclosure, a maintained switch is a switch that maintains the position that was set in the most recent switch actuation. A maintained switch works in an opposite manner to a momentary switch.

Mount: As used in this disclosure, a mount is a mechanical structure that attaches or incorporates an object into a load path.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pedestal: As used in this disclosure, a pedestal is an intermediary load bearing structure that that transfers a load path between a supporting surface and an object, structure, or load.

Pivot: As used in this disclosure, a pivot is a rod or shaft around which an object rotates or swings.

Potentiometer: As used in this disclosure, a potentiometer is an adjustable electrical device that presents a resistance to a voltage. The level of resistance is adjustable.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pull-Down Resistor: As used in this disclosure, a pull-down resistor is an electrical resistor that is used within a switching or logic to present a predetermined signal voltage to a logic circuit.

Pull-Up Resistor: As used in this disclosure, a pull-up resistor is an electrical resistor used to: 1) limit the current flow through a switching device; and, 2) to control the voltage level presented across a switch, a load resistor, or a pull-down resistor.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Relaxed Shape: As used in this disclosure, a structure is considered to be in its relaxed state when no shear, strain, or torsional forces are being applied to the structure.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Slot: As used in this disclosure, a slot is a long narrow channel or aperture formed in or through an object.

Speaker: As used in this disclosure, a speaker is an electrical transducer that converts an electrical signal into an audible sound.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertical pole, post, or support often used to change the elevation of an object.

Stop-Motion: As used in this disclosure, a stop-motion is a second device that limits the range of a first object. The range of the first object is selected from the group consisting of a range of motion or a range of rotation.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Terminal: As used in this disclosure, a terminal is the end point of a conductor. A terminal can be the conducting wire itself or may have attached to is a device designed to facilitate an electrical connection.

Transducer: As used in this disclosure, a transducer is a device that converts a physical quantity, such as pressure or brightness into an electrical signal or a device that converts an electrical signal into a physical quantity.

Transistor: As used in this disclosure, a transistor is a general term for a three-terminal semiconducting electrical device used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An angling device comprising:
a tripod, a pedestal, and a control circuit;
wherein the pedestal mounts on the tripod;
wherein the control circuit is contained within the pedestal;
wherein the angling device is a stand;
wherein the angling device is a free-standing fishing strike indicating device;
wherein the angling device is configured for use with a fishing rod;
wherein the fishing rod mounts in the angling device during angling;
wherein the fishing rod is further defined with a fishing line;
wherein the fishing rod is further defined with a cant;
wherein the fishing line is further defined with an angle of attack;
wherein the cant is a measure of an angle between the fishing rod and a horizontal plane that is perpendicular to the force of gravity;
wherein the angle of attack is a measure of an angle between the fishing line and a plane formed by water;
wherein the angling device allows for the adjustment of the cant;
wherein an adjustment of the cant allows for an adjustment of the angle of attack;
wherein the tripod comprises a first leg, a second leg, a third leg, and a pedestal mount;
wherein the first leg, the second leg, and the third leg attach to the pedestal mount;
wherein the pedestal comprises a base block, an elevation plate, an inferior rod support, and the superior rod support;
wherein the elevation plate, the inferior rod support, and the superior rod support attach to the base block;
wherein the elevation plate further comprises an elevation slot;
wherein the elevation slot is a slot formed through the elevation plate;
wherein the inferior rod support attaches to the elevation slot such that an elevation of the inferior rod support is changed by changing a position of the inferior rod support relative to the elevation slot.

2. The angling device according to claim 1
wherein the tripod is a supporting structure;
wherein the tripod raises an elevation of the pedestal relative to the ground;
wherein the tripod forms a load path between the pedestal and the ground supporting the angling device;
wherein the tripod rotates relative to the pedestal;
wherein the fishing rod mounts on the pedestal;
wherein the control circuit is an electrical circuit;

wherein the control circuit detects when a fish has struck the fishing line and generates a visible alarm and an audible alarm;

wherein the control circuit detects the fish strike by detecting a change in the cant of the fishing rod.

3. The angling device according to claim 2
wherein the first leg is a shaft structure;
wherein the second leg is a shaft structure;
wherein the third leg is a shaft structure;
wherein the first leg is a supporting structure such that the elevation of the pedestal is raised above the ground by a span of the length of the first leg;
wherein the second leg is a supporting structure such that the elevation of the pedestal is raised above the ground by a span of the length of the second leg;
wherein the third leg is a supporting structure such that the elevation of the pedestal is raised above the ground by a span of the length of the third leg.

4. The angling device according to claim 3
wherein the pedestal mount is a mounting structure;
wherein the pedestal mount forms a superior structure of the tripod;
wherein the pedestal mount attaches the pedestal to the first leg, the second leg, and the third leg;
wherein the pedestal mount is a hinged structure such that the first leg, the second leg, and the third leg can rotate relative to the pedestal mount.

5. The angling device according to claim 4
wherein the base block is a rectilinear block structure;
wherein the base block comprises a superior face, an inferior face, and a handle;
wherein the superior face is a face of the base block that is distal from the ground;
wherein the superior face forms an superior horizontal surface of the base block;
wherein the inferior face is the face of the base block that is distal from the superior face;
wherein the inferior face forms an inferior horizontal surface of the base block;
wherein the pedestal mount attaches to the inferior face.

6. The angling device according to claim 5
wherein the inferior rod support is a supporting structure on which the fishing rod rests;
wherein the inferior rod support attaches to the elevation plate such that an elevation of the inferior rod support above the ground is adjustable;
wherein the inferior rod support attaches to the elevation plate such that an angle formed by the inferior rod support relative to the ground is adjustable;
wherein the fishing rod rests on the inferior rod support such that the inferior rod support forms a pivot around which the fishing rod rotates.

7. The angling device according to claim 6
wherein the inferior rod support comprises a stanchion, and a tensioning detent;
wherein the tensioning detent attaches the stanchion to the elevation slot of the elevation plate such that the stanchion rotates relative to the elevation plate;
wherein the tensioning detent forms the pivot around which the angle between the inferior rod support and the ground adjusts.

8. The angling device according to claim 7
wherein the superior rod support attaches to the superior face of the base block;
wherein the superior rod support and the superior face of the base block combine to form a loop structure into which the fishing rod inserts;
wherein the superior rod support rotates relative to the superior face of the base block;
wherein the superior rod support forms a structure that is superior to the fishing rod such that a rotation of the superior rod support forms a stop-motion that limits a range of rotation of the fishing rod around the inferior rod support;
wherein a position of the superior rod support is such that the superior rod support on the superior face is adjustable.

9. The angling device according to claim 8
wherein the superior rod support comprises a hyoid structure, a first spring hinge, a second spring hinge, a first groove, and a second groove;
wherein the first spring hinge, the second spring hinge, the first groove, and the second groove attach the hyoid structure to the superior face;
wherein the hyoid structure is a hyoid-shaped structure;
wherein the fishing rod inserts underneath the hyoid structure such that the hyoid structure limits a rotation of the fishing rod around the inferior rod support;
wherein the hyoid structure is further defined with a first hyoid arm, a second hyoid arm, and a hyoid crossbeam.

10. The angling device according to claim 9
wherein the first spring hinge is a spring-loaded hinge;
wherein a relaxed shape of the first spring hinge holds the hyoid structure in a position that is parallel to the superior face of the base block;
wherein the second spring hinge is a spring-loaded hinge;
wherein a relaxed shape of the second spring hinge holds the hyoid structure in a position that is parallel to the superior face of the base block;
wherein the first spring hinge attaches the first hyoid arm to the first groove such that the first hyoid arm moves freely within the first groove;
wherein the second spring hinge attaches the second hyoid arm to the second groove such that the second hyoid arm moves freely within the second groove;
wherein the first spring hinge presses the hyoid crossbeam down upon the fishing rod such that the hyoid structure maintains its position on the fishing rod;
wherein the second spring hinge presses the hyoid crossbeam down upon the fishing rod such that the hyoid structure maintains its position on the fishing rod;
wherein the first groove is a channel that is formed in the superior face of the base block;
wherein the second groove is a channel that is formed in the superior face of the base block;
wherein the first groove guides a movement of the first hyoid arm and the first spring hinge in a horizontal direction along the superior face;
wherein the second groove guides a movement of the second hyoid arm and the second spring hinge in the horizontal direction along the superior face.

11. The angling device according to claim 10
wherein the control circuit comprises a battery, a master switch, a plurality of alarms and lamps, and a comparator circuit;
wherein the battery, the master switch, the plurality of alarms and lamps, and the comparator circuit are electrically interconnected;
wherein the master switch is further defined with a thirteenth lead and a fourteenth lead;
wherein the battery is further defined with a positive terminal and a negative terminal;
wherein the battery is a chemical device;

wherein the battery converts chemical potential energy into electrical energy;

wherein the master switch is a maintained switch;

wherein the master switch controls a flow of electricity from the battery into the plurality of alarms and lamps and the comparator circuit;

wherein the plurality of alarms and lamps forms the set of visual and audible alarms that indicate a fish strike;

wherein the comparator circuit is an electrical circuit;

wherein the comparator circuit measures a voltage generated by a position of the superior rod support relative to the superior face of the base block;

wherein the comparator circuit compares a measured voltage generated by the position of the superior rod support to a threshold voltage;

wherein the plurality of alarms and lamps comprises one or more LEDs and a speaker;

wherein the one or more LEDs and the speaker electrically connect to the comparator circuit;

wherein the speaker is further defined with a fifteenth lead and a sixteenth lead;

wherein each of the one or more LEDs is further defined with an anode and a cathode;

wherein each of the one or more LEDs is identical;

wherein the one or more LEDs physically generate an illumination that forms a visual alarm portion of the plurality of alarms and lamps;

wherein the one or more LEDs further comprises a pull-down resistor;

wherein the pull-down resistor is further defined with an eleventh lead and a twelfth lead;

wherein the pull-down resistor is a resistor that is placed in series with the one or more LEDs;

wherein the speaker is a transducer that converts an electrical signal into an audible sound;

wherein the speaker physically generates an audible sound that forms an audible alarm portion of the plurality of alarms and lamps;

wherein the speaker is a buzzer.

12. The angling device according to claim 11 wherein the comparator circuit comprises a position divider, a threshold divider, a differential amplifier, a transistor, and a limit resistor;

wherein the position divider, the threshold divider, the differential amplifier, the transistor, and the limit resistor are electrically interconnected;

wherein the limit resistor is further defined with a ninth lead and a tenth lead;

wherein the differential amplifier is further defined with a first amplifier input, a second amplifier input, and an amplifier output;

wherein the transistor is further defined with a collector, an emitter, and a base.

13. The angling device according to claim 12 wherein the position divider is a voltage divider;

wherein the position divider presents a measured voltage to the differential amplifier that varies as a function of a position of the second spring hinge;

wherein the position divider further comprises a first pull-up resistor and a first potentiometer;

wherein the first pull-up resistor is further defined with a first lead and a second lead;

wherein the first potentiometer is further defined with a third lead and a fourth lead;

wherein the first pull-up resistor is a fixed value electrical resistor;

wherein the first pull-up resistor electrically connects in series with the first potentiometer;

wherein the first potentiometer is a potentiometer that connects to the second spring hinge such that a rotation of the second spring hinge varies a resistance presented by the first potentiometer;

wherein the threshold divider is a voltage divider;

wherein the threshold divider is manually adjustable;

wherein the threshold divider further comprises a second pull-up resistor and a second potentiometer;

wherein the second pull-up resistor is further defined with a fifth lead and a sixth lead;

wherein the second potentiometer is further defined with a seventh lead and an eighth lead;

wherein the second pull-up resistor is a fixed value electrical resistor;

wherein the second pull-up resistor electrically connects in series with the second potentiometer;

wherein the second potentiometer sets the threshold voltage against which the measured voltage from the position divider is compared.

14. The angling device according to claim 13 wherein the differential amplifier is an electrical device amplifies a difference between a measured voltage and a threshold voltage;

wherein the transistor is a three-terminal semiconductor device;

wherein the transistor operates as a switch;

wherein the transistor operates as a switch that allows electricity to flow from the master switch to the plurality of alarms and lamps;

wherein the limit resistor is an electrical resistor that limits the flow of electricity from the amplifier output of the differential amplifier into a base of the transistor.

15. The angling device according to claim 14 wherein the positive terminal of the battery electrically connects to the thirteenth lead of the master switch;

wherein the fourteenth lead of the master switch electrically connects to the first lead of the first pull-up resistor;

wherein the fourteenth lead of the master switch electrically connects to the fifth lead of the second pull-up resistor;

wherein the fourteenth lead of the master switch electrically connects to the collector of the transistor;

wherein the second lead of the first pull-up resistor electrically connects to the third lead of the first potentiometer;

wherein the second lead of the first pull-up resistor electrically connects to the first amplifier input of the differential amplifier;

wherein the sixth lead of the second pull-up resistor electrically connects to the seventh lead of the second potentiometer;

wherein the sixth lead of the second pull-up resistor electrically connects to the second amplifier input of the differential amplifier;

wherein the amplifier output of the differential amplifier electrically connects to the ninth lead of the limit resistor;

wherein the tenth lead of the limit resistor electrically connects to the base of the transistor;

wherein the emitter of the transistor electrically connects to the anode of each of the one or more LEDs;

wherein the emitter of the transistor electrically connects to the fifteenth lead of the speaker;

wherein the cathode of each of the one or more LEDs electrically connects to the eleventh lead of the pull-down resistor;

wherein the sixteenth lead of the speaker electrically connects to the negative terminal of the battery;

wherein the twelfth lead of the pull-down resistor electrically connects to the negative terminal of the battery;

wherein the eighth lead of the second potentiometer electrically connects to the negative terminal of the battery;

wherein the fourth lead of the first potentiometer electrically connects to the negative terminal of the battery.

\* \* \* \* \*